US006428088B1

(12) United States Patent
Castonguay et al.

(10) Patent No.: US 6,428,088 B1
(45) Date of Patent: Aug. 6, 2002

(54) LOCKING SUNSHADE SYSTEM

(75) Inventors: Robert L. Castonguay, Fenton;
Douglas R. Hare, Rochester Hills, both of MI (US)

(73) Assignee: Meritor Light Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/567,300

(22) Filed: May 8, 2000

(51) Int. Cl.[7] .................................................. B60J 7/00
(52) U.S. Cl. ...................................................... 296/214
(58) Field of Search ................................ 296/214, 224; 292/DIG. 5

(56) References Cited

U.S. PATENT DOCUMENTS 2,389,315 A * 11/1945 Kerr ........................ 296/224 X
3,372,954 A * 3/1968 De Coye De Castelet .. 296/224 X
3,610,682 A * 10/1971 Vermeulen .............. 296/224 X
4,650,244 A * 3/1987 Boots ...................... 296/214 X
4,913,486 A * 4/1990 Staley et al. ............. 296/224 X

FOREIGN PATENT DOCUMENTS

DE            975193    * 9/1961 ................. 296/224
JP         356099818    * 8/1981 ................. 296/224

* cited by examiner

*Primary Examiner*—Dennis H. Pedder
(74) *Attorney, Agent, or Firm*—Carlson, Gaskey & Olds

(57) ABSTRACT

In a disclosed embodiment, the interior sliding sunshade portion of a "moon roof" of a vehicle is provided with an improved system for locking an overhead sunshade in an open or closed position while allowing it to slide relatively freely during sliding movement. The sunshade is provided with a spring-biased cam locking system that reduces frictional contact between the edges of the sunshade and the side tracks within which it slides when the vehicle operator manually slides the sunshade to an open or closed position. The improved system further includes a mechanism for engaging and opening the overhead sunshade automatically when the corresponding overhead window is opened.

17 Claims, 3 Drawing Sheets

LOCKING SUNSHADE SYSTEM

BACKGROUND OF THE INVENTION

This invention relates to a system for locking an overhead sunshade in an open or closed position while allowing it to slide relatively freely during movement. The improved system further includes a mechanism for engaging and opening the overhead sunshade when the corresponding overhead window is opened.

It is common for modern vehicles to be equipped with a "moon roof" in the ceiling of the cab of the vehicle. Generally, the "moon roof" consists of a slidable glass window in the roof of the vehicle and a corresponding slidable sunshade in the cab interior which may cover the window. During operation, the sunshade may be opened completely or partially, with the window closed, to allow the desired inflow of day or night light. Alternatively, the window and sunshade may both be partially or completely opened to allow an inflow of fresh air as well as light.

Typically, the window and the sunshade open from the front to the back of the vehicle. Window movement is powered by a motor controlled by the vehicle operator. The sunshade is typically manually moved by the vehicle operator, although the window is moved to open, it opens the sunshade.

During vehicle operation, it is desirable that the sunshade remains in the position to which it has been moved and does not slide freely when the vehicle undergoes acceleration or braking. As an example, if the sunshade is open and the vehicle is suddenly stopped, the force on the sunshade tends to close the sunshade. To resist this force, the sunshade is mounted with a significant degree of frictional contact between the side edges of the sunshade and the side tracks within which it slides. This frictional contact resists the forces imposed upon the sunshade during vehicle acceleration or braking. However, this frictional contact sometimes results in a sunshade that is difficult or awkward to manually operate by the driver, that is the force to move the sunshade must overcome this frictional force, and thus the force is sometimes undesirably high.

It would be desirable to provide a slidable sunshade with a mechanism that would reduce or disable the frictional contact between the side edges of the sunshade and the side tracks within which it slides during manual sliding.

SUMMARY OF THE INVENTION

In the disclosed embodiment of this invention, a sunshade is provided with a spring biased cam locking system that may reduce the frictional contact between the side edges of the sunshade and the side tracks within which it slides when the vehicle operator manually slides the sunshade to an open or closed position. This allows smooth and easy operation of the sunshade by the vehicle operator while providing high frictional contact once the sunshade is positioned as desired. Thus, the sunshade, once positioned, does not uncontrollably slide open or closed in response to forces imposed by vehicle acceleration and braking.

Although a particular embodiment of the locking system is disclosed, it should be understood that this application extends to many distinct locking systems. The disclosed system is merely an example of one which can provide the inventive goals and features.

The spring-biased cam locking system includes a cross bar that extends across the width of the sunshade. The width, in this case, refers to the direction from side to side of the vehicle. The cross bar is separated into two segments at its midpoint providing an inner end surface on each cross bar segment that slides along respective opposing surfaces of a cam element positioned between the cross bar segments. The outermost, or extreme, ends of the cross bar segment frictionally and slidably interfit in the side tracks within which the sunshade slides. The cam element is provided with forward and rearward extensions and a frontwardly extending pull tab for manually pulling or sliding the sunshade closed and open.

Each cross bar segment is provided with a spring element which biases each cross bar segment toward each respective cam element surface. The cam element is provided with a pair of equalizing spring elements that work together. The cam element is symmetrical and has opposing operative surfaces that work with the inner end surface of each of the two cross bar segments. The opposing operative surfaces of the cam element comprise an opposing pair of frontward recesses and an opposing pair of rearward recesses separated by an opposing pair of laterally extending protuberances, each containing a small notch. The inner end surface of each cross bar segment is designed to interfit with both pairs of recesses as well as the pair of small notches.

At rest, the tensile and compressive forces on the pair of spring elements in the cam element are equalized. The inner end surface of each cross bar segment is received by each of the pair of small notches in each laterally extending protuberance, thus pushing each cross bar segment in opposing directions so that the outermost ends of the cross bar segments are frictionally engaged in the side tracks of the sunshade. Thus, the sunshade is frictionally locked into position.

Alternatively, when the sunshade is manually moved by a vehicle operator using the frontwardly extending pull tab, the inner end surface of each cross bar segment is received by either the rearward or frontward pair of recesses thus allowing the cross bar segments to be biased inwardly. Hence, the outermost ends of the cross bar segments are no longer frictionally received within the side tracks of the sunshade and frictional contact is thus reduced.

Further, as will be disclosed below, the locking system is released during the automatic movement of the window to an open position.

During the forward or rearward movement of the sunshade, the tensile and compressive forces in the pair of spring elements in the cam element are no longer equal. Once movement is halted, however, the spring elements in the cam element equalize their tensile and compressive forces, resulting in forward or rearward movement of the cam element which, in turn, causes the laterally extending protuberances to push the cross bar segments outward from each other until their inner end surfaces engage the pair of small notches and the outermost ends of the cross bar segments are once again frictionally engaged within the side tracks of the sunshade.

These and other features of the present invention can be best understood from the following specification and drawings, the following of which is a brief description.

DETAILED DESCRIPTION OF THE DRAWINGS

Figure 1:
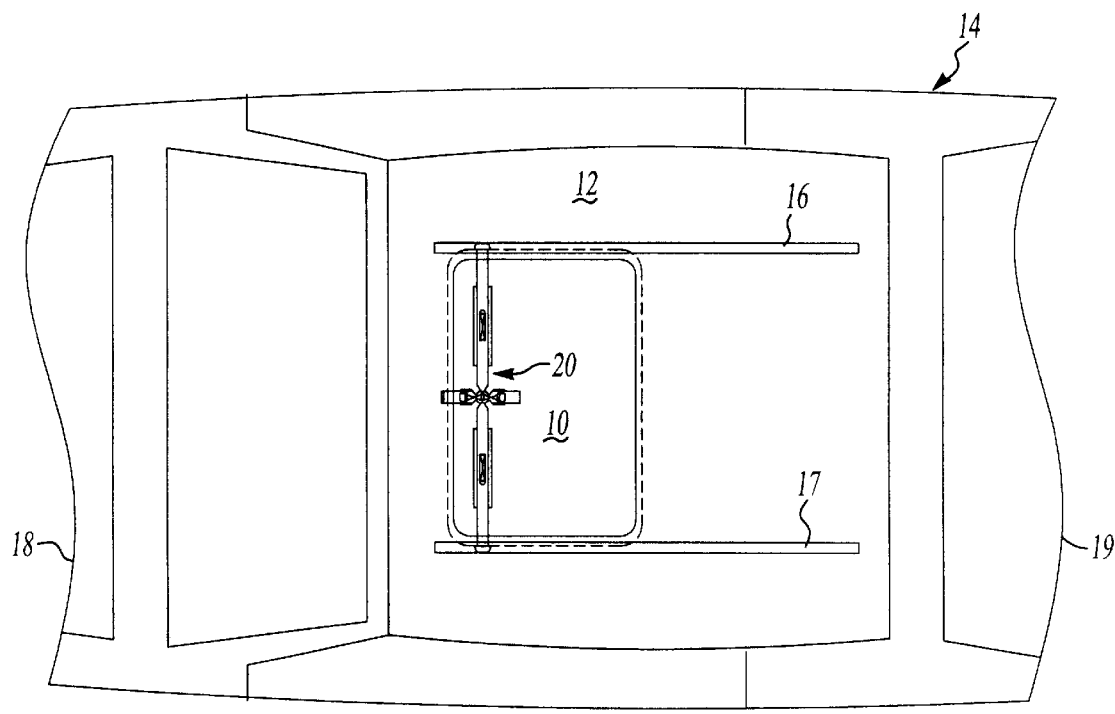
FIG. 1 schematically shows a vehicle roof incorporating a sunshade utilizing the spring biased cam locking system of the present invention.

As shown schematically in FIG. 1, sunshade 10 is incorporated into the interior of the roof 12 of vehicle 14. Roof 12 is provided with side tracks 16, 17. Sunshade 10 may slide within side tracks 16, 17 from a closed position towards the front 18 of the vehicle 14 to an open position towards the rear 19 of the vehicle 14. Element 20 is a spring biased cam locking system in a locked and a closed position.

Figure 2:
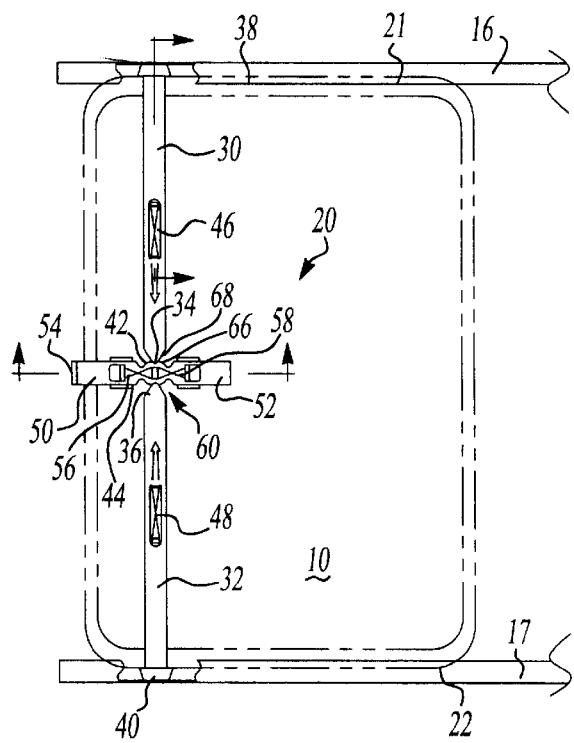
FIG. 2 is a more detailed view of the inventive system.

Referring now to FIG. 2, sunshade 10 has side edges 21, 22 that are slidingly housed in side tracks 16, 17. Attached to sunshade 10 is spring-biased cam locking system 20. System 20 generally comprises cross bar segments 30, 32 separated by cam element 60. Cross bar segments 30, 32 each have an inner end surface 34, 36 and laterally spaced outer end portions 38, 40. Each inner end surface 34, 36 of cross bar segments 30, 32 slides along respective opposing operative surfaces 42, 44 of cam element 60. Laterally spaced end portions 38, 40 frictionally and slidably fit within side tracks 16,17. Each cross bar segment 30, 32 is further provided with a spring element 46, 48 which biases each cross bar segment 30, 32 toward each respective cam surface 42, 44.

Cam element 60 is provided with forward extension 50 and rearward extension 52 as well as frontwardly extending pull tab 54 for manually pulling the sunshade 10 closed or open. Cam element 60 is further provided with a pair of equalizing spring elements 56, 58 that work together.

Cross bar segments 30, 32 are symmetrically positioned and operate identically. Thus, the description of one cross bar 30 applies to the other 32. Cam element 60 is also symmetrical and has identical opposing operative surfaces 42, 44. The description of surface 42 also applies to identical surface 44. With this in mind please refer now to FIGS. 3 and 4.

Each operative surface 42 of cam element 60 comprises a frontward recess 62 and a rearward recess 64 separated by a laterally extending protuberance 66 containing a small notch 68. The inner end surface of cross bar segment 30 is designed to interfit with both recesses 62, 64 as well as notch 68.

Briefly referring back to FIG. 2, spring biased cam locking system 20 is shown in locked position. In this position, tensile and compressive forces on spring elements 56, 58 of cam element 60 are equalized. That is, spring elements 56 and 58 hold cam element 60 in this position, unless moved away. The inner end surface 34 of cross bar segment 30 is received by notch 68 in laterally extending protuberance 66. This pushes cross bar segment 30 outwards such that outer end portion 38 is forced into frictional engagement with side track 16 and sunshade 10 is thus locked into position.

Figures 3, 4:
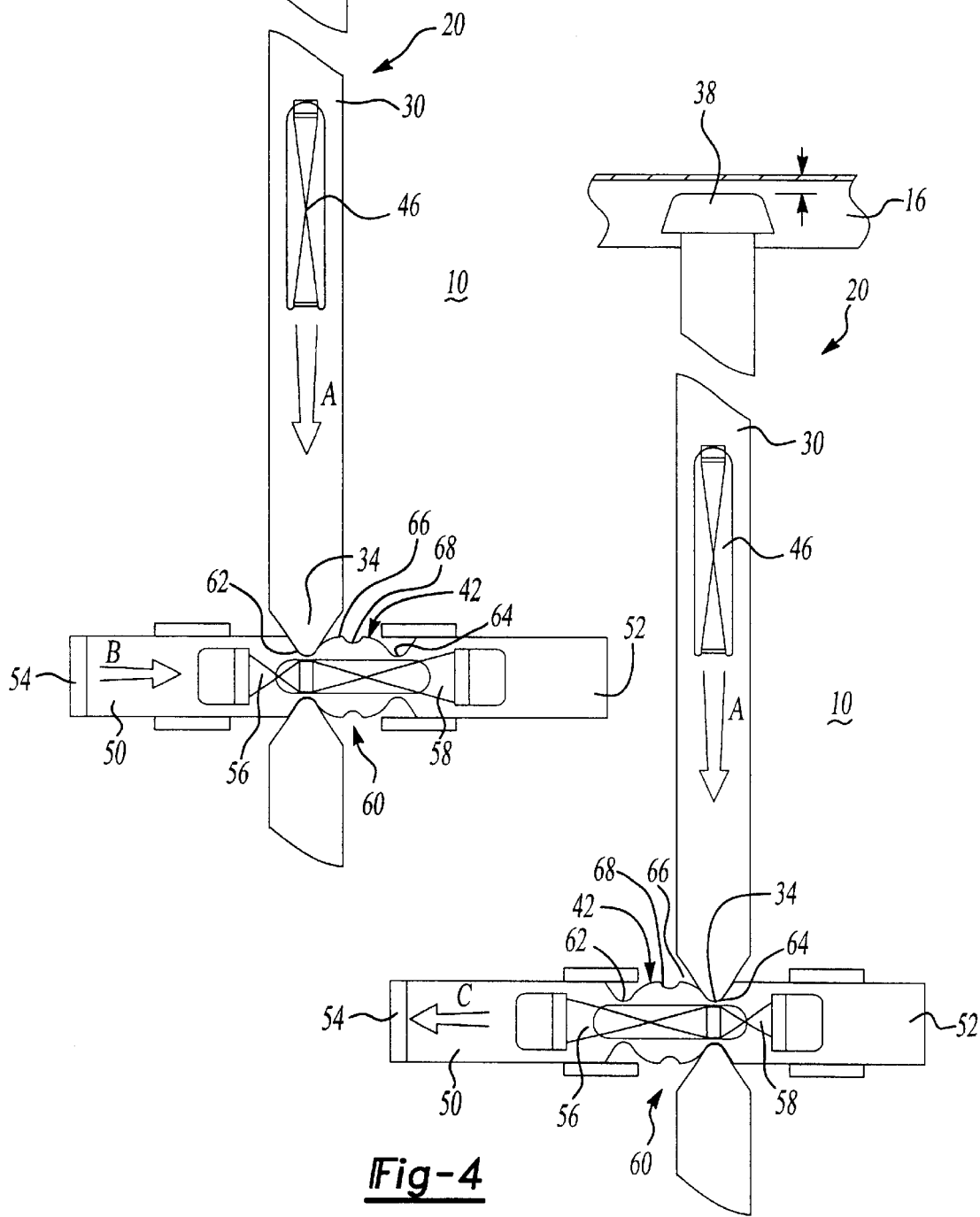
FIG. 3 schematically shows a view of the inventive system as the sunshade is being moved to an open position.
FIG. 4 schematically shows a view of the inventive system as the sunshade is being moved to a closed position.

Alternatively, and with respect to FIGS. 3 and 4, when sunshade 10 is manually moved by a vehicle operator using frontwardly extending pull tab 54, inner end surface 34 of cross bar segment 30 is received by frontward recess 62 or rearward recess 64, thus allowing the cross bar segments to bias closer inwardly toward each other as indicated by arrow A.

During rearward movement, or opening, of the sunshade 10 as shown in FIG. 3 by arrow B, inner surface 34 of cross bar segment 30 is biased inwardly by spring 46 to engage frontward recess 62.

Referring to FIG. 4, during forward movement, or closing, of sunshade 10 as shown by arrow C, inner surface 34 of cross bar segment 30 is biased inwardly by spring 46 to engage rearward recess 64.

In both FIGS. 3 and 4, the tensile and compressive forces of spring elements 56, 58 are no longer equal. Once movement stops, however, spring elements 56, 58 equalize their tensile and compressive forces, resulting in forward movement of the cam element 60 in the case of FIG. 3, and rearward movement of the cam element 60 in the case of FIG. 4 back to the FIG. 2 position. This, in turn, causes the laterally extending protuberance 66 to push cross bar segment 30 outward until inner end surface 34 engages notch 68. At this point, outer end portion 38 is again forced into frictional engagement with side track 16 and sunshade 10 is thus locked into position.

Figure 5:
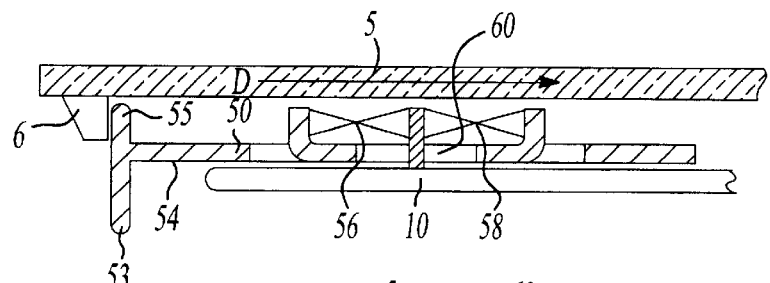
FIG. 5 schematically shows a cross sectional view along the length of the cam element of the inventive system.
Figure 6:
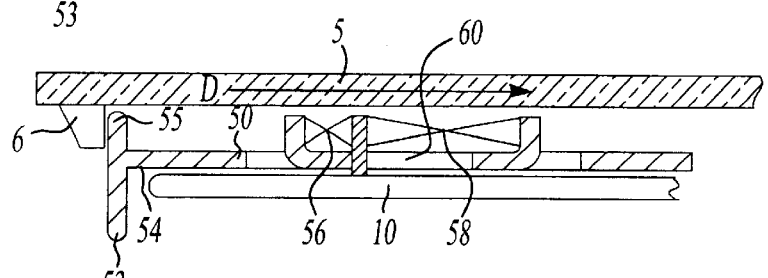
FIG. 6 schematically shows a cross sectional view along the length of the cam element of the inventive system as the sunshade is automatically opened along with the corresponding overhead window.
Figure 7:
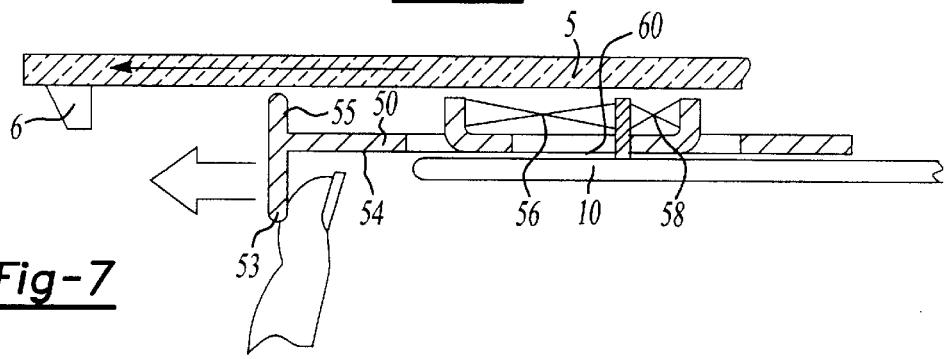
FIG. 7 schematically shows a cross sectional view along the length of the cam element of the inventive system as the sunshade is manually closed to cover the already closed overhead window.

FIGS. 5, 6, and 7 show cross sectional views along the length of cam element 60. As shown, cam element 60 includes a pair of equalizing spring elements 56, 58 forward extension 50 and frontwardly extending pull tab 54. Pull tab 54 comprises downwardly extending handle 53 and upwardly extending stop tab 55. Cam element 60 is attached to sunshade 10. Overhead window 5 is provided with downwardly extending tab 6 which may abut upwardly extending stop tab 55. FIG. 5 shows overhead window 5 and sunshade 10 in closed position. The overhead window 5 may open in the direction shown by arrow D. As shown in FIG. 6, when overhead window 5, which is operated electronically, opens, downwardly extending tab 6 pushes onto pull tab 54 by way of upwardly extending stop tab 55 and forces sunshade 10 to automatically open. Cam element 60 operates as set forth in the description of FIGS. 2, 3, and 4 above. When over head window 5 stops, sunshade 10 also stops. Overhead window 5 may then be electronically closed as shown in FIG. 7. However, sunshade 10 may only close manually as shown in the Figure, with cam 60 operating as set forth above in the description of FIGS. 2, 3, and 4.

Figure 8:
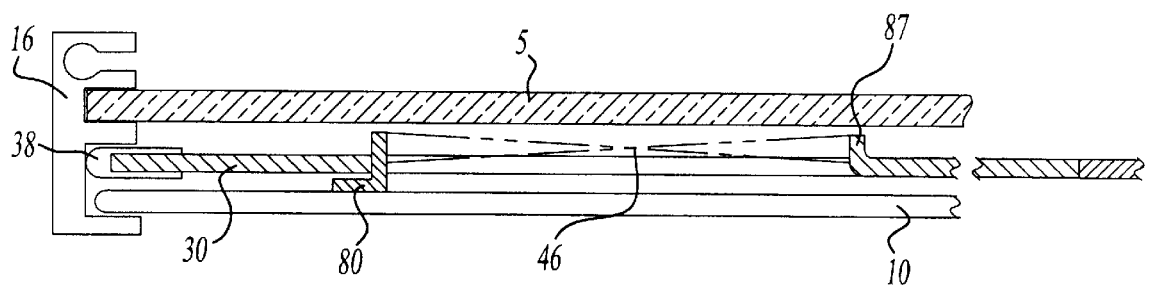
FIG. 8 schematically shows a portion of the cross sectional view of the outermost end of a cross bar segment.

FIG. 8 shows a detail of a cross sectional view of outer end portion 38 of cross bar 30 in frictional engagement with side track 16. Overhead window 5 also slides within side track 16. As shown, a stop 80 on the sunshade 10 provides a stop for the spring 46 which is also fixed to a surface 87 on segment 30. In this way, the segments are biased towards the cam 60, as described above.

A preferred embodiment of this invention has been disclosed. However, a worker of ordinary skill in this art would recognize that certain modifications would come within the scope of this invention. For that reason, the following claims should be studied to determine the true scope and content of this invention.

What is claimed is:

1. An overhead window and sunshade system for use in the roof of a vehicle comprising:

an overhead window slidable between an open and a closed position;

an overhead sunshade positioned interior to said overhead window and being slidable within a pair of laterally spaced side tracks between an open and a close position; and a device having a cam element movable between a locked position for locking said sunshade at a position with a frictional force and a released position reducing said frictional force during said sliding movement of said sunshade; and structure being provided on said overhead window which selectively engages a structure associated with said device, such that when said overhead window moves to said open position, said structure on said overhead window engages said structure on said device and moves said device to said released position such that said sunshade moves to said open position with said window.

2. An overhead window and sunshade system as recited in claim 1, wherein said device includes a spring-biased cam locking system, with a crossbar having segments extending between said pair of laterally spaced side tracks, and a cam element with operative surfaces positioned between said cross bar segments.

3. An overhead window and sunshade system as recited in claim 2, wherein said cross bar segments have an inner end surface which engages an operative surface of said cam element, an end portion frictionally engaged within one of said side tracks in locked position.

4. An overhead window and sunshade system as recited in claim 2, wherein said engagement structure on said overhead window includes a downwardly depending tab and said device includes an upwardly extending stop tab coacting with said downwardly extending tab with said downwardly extending tab moving said stop tab and sunshade from said close position to said open position when said overhead window moves from said closed position to said open position.

5. An overhead window and sunshade system as recited in claim 1, wherein said engagement structure on said overhead window includes a downwardly extending tab and said overhead sunshade includes a portion with an upwardly extending stop tab coacting with said downwardly extending tab in engagement with one another when said overhead window and sunshade moved from said closed position to said open position.

6. An overhead window and sunshade system for use in the roof of a vehicle comprising:

an overhead window slidable between an open and a closed position;

an overhead sunshade being slidable within said pair of laterally spaced side tracks between an open and a closed position;

a spring-biased cam locking system for locking said sunshade in a set position by applying a frictional force to said side tracks that is disabled during said sliding movement of said sunshade, said system having a crossbar with segments extending between said pair of laterally spaced side tracks, and a cam element with operative surfaces positioned between said cross bar segments; and structure being provided on said overhead window which selectively engages a structure associated with said system, such that when said overhead window moves to said open position, said structure on said overhead window engages said structure on said system and moves said system to said released position such that said sunshade moves to said open position with said window.

7. An overhead window and sunshade system as recited in claim 6, wherein said cross bar segments each have an inner end surface which engages an operative surface of said cam element, an end portion frictionally engaged within one of said side tracks in said locked position and a spring element which biases said inner end surface towards said cam element.

8. An overhead window and sunshade system as recited in claim 2, wherein said outer end of cross bar segments engage said side tracks in an infinite number of positions.

9. An overhead window and sunshade system a recited in claim 3, wherein said operative surfaces of said cam element engage said inner end surface of said cross bar segments in said released position.

10. An overhead window and sunshade system as recited in claim 9, wherein said operative surfaces of said cam element engage said inner surfaces of said cross bar segments in said locked position, said end portions frictionally engaging said side tracks in said locked position.

11. An overhead window and sunshade system as recited in claim 7, wherein said operative surfaces of said cam element engage said inner end surface of said cross bar segments in a released position.

12. An overhead window and sunshade system as recited in claim 11, wherein said operative surfaces of said cam element engage said inner surfaces of said cross bar segments in a locked position, said end portions frictionally engaging said side tracks in said locked position.

13. An overhead window and sunshade system a recited in claim 2, wherein said segments are collinear.

14. An overhead window and sunshade system as recited in claim 13, wherein said segments are moveable in a first direction and said cam element is moveable in a second direction transversed to said first direction.

15. An overhead window and sunshade system as recited in claim 14, wherein said cam element is at a right angle relative to said segments.

16. An overhead window and sunshade system as recited in claim 6, wherein said segments are moveable in a first direction and said cam element is moveable in a second direction transversed to said first direction.

17. An overhead window and sunshade system as recited in claim 16, wherein said cam element is at a right angle relative to said segments.

* * * * *